UNITED STATES PATENT OFFICE.

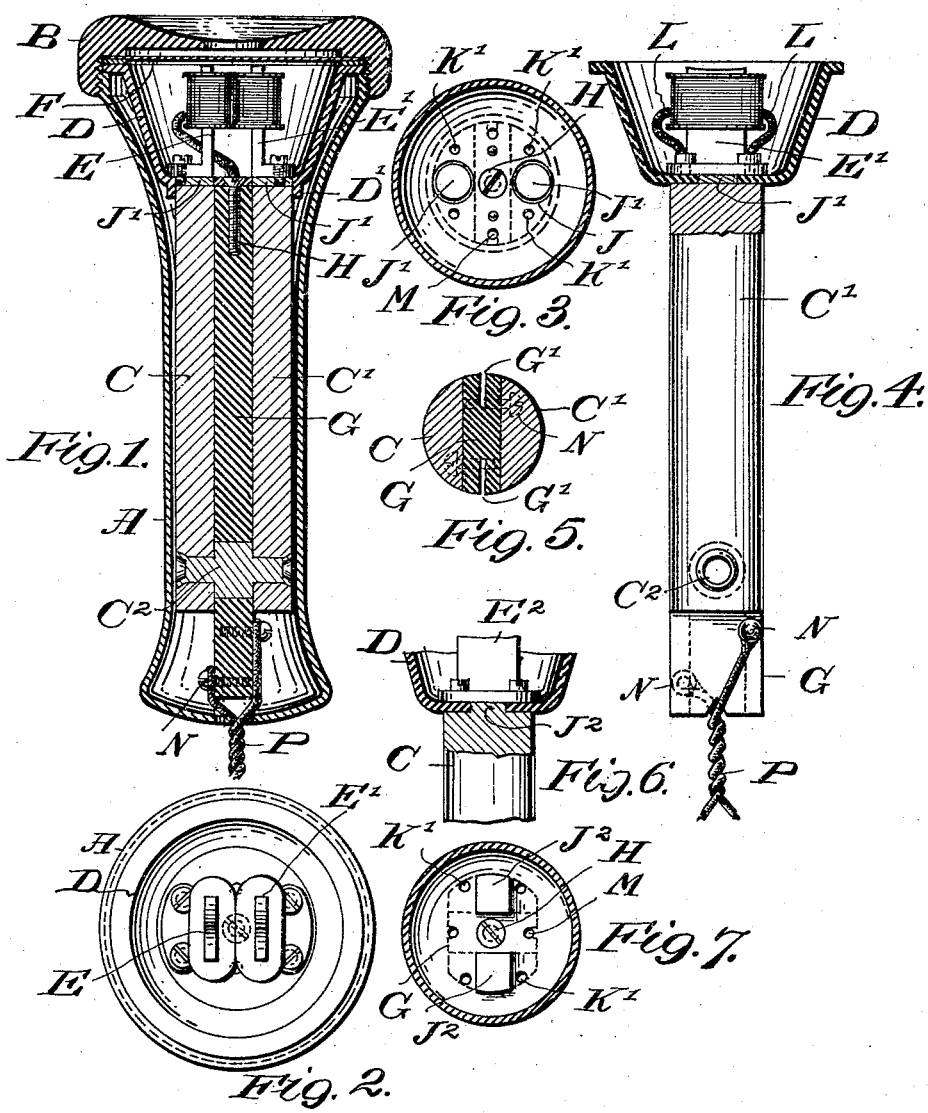

ALEXANDER MARR, OF MANCHESTER, ENGLAND.

TELEPHONIC RECEIVER.

1,087,128.  Specification of Letters Patent.  Patented Feb. 17, 1914.

Application filed January 3, 1913. Serial No. 740,837.

*To all whom it may concern:*

Be it known that I, ALEXANDER MARR, a subject of the King of Great Britain and Ireland, and a resident of Manchester, England, have invented new and useful Improvements in Telephonic Receivers, of which the following is a specification.

This invention relates to improvements in that type of telephonic receiver (generally known as the Western Electric type) in which the upper ends of the two limbs of a magnet are combined with a brass or other non-magnetic cup which contains the pole pieces. In such an instrument as at present commonly made the ends of the magnet abut against the lower face of the brass or other cup, and the pole pieces are magnetically and mechanically connected to the ends of the limbs of the magnet by means of iron screws from the pole pieces passing through the brass cup and screwing into holes tapped in the ends of the magnet limbs.

In a receiver constructed to embody my improvements there are no screws entering into the ends of the magnet limbs and the ends of these limbs (or extensions thereof) pass through the substance of the brass cup and are flush with or project slightly above the inner surface of the cup. They are held in position relatively to the cup by a screw which passes down through the cup and engages with a packing member of vulcanized fiber or other non-magnetic material contained and held between the limbs of the magnet or being otherwise combined with or secured to their ends. This fiber, or shoulders formed on the ends of the magnet limbs, or the ends of such limbs themselves limits or limit the movement of the cup toward or along the magnet limb ends and forms or form a seat or seats for the cup. The pole pieces are then laid on the ends of the magnet limbs or the extensions thereof on the inner face of the cup and are secured by screws engaging with the cup. These screws may be of magnetic metal and in the case of extensions only from the magnet ends passing through the brass cup, their ends may abut against the magnet ends or against shoulders on such ends. By this construction all boring and tapping of the magnet ends for the purpose of securing them to the brass cup is avoided. The extensions may be integral with the magnets or they may be separate iron or steel disks which fit within holes formed through the cup and are of a thickness to extend from the magnet ends on the lower or outer face of the cup to the inner or upper face of the cup.

The accompanying drawings illustrate two modifications in the means for combining the brass cup, the pole pieces, and the magnet ends according to this invention. In the modification shown in Figs. 1 o 4 inclusive the extensions of the magnet are separate iron disks. In the modification shown in Figs. 6 and 7 the extensions of the magnet are integral with its limbs.

Fig. 1 is a longitudinal section of an improved receiver. Fig. 2 is an end view of such receiver with the cap removed. Fig. 3 is a cross sectional view across the cup with the pole pieces removed. Fig. 4 is a sectional elevation of parts of the same receiver. Fig. 5 is a cross sectional view of the magnet limbs and the fiber between them. Fig. 6 is a sectional elevation of parts of a receiver the magnet of which has extensions which are integral with its limbs. Fig. 7 is an end view of the parts of Fig. 6 with the pole pieces removed.

A indicates the casing of the instrument; B the screw cap; C C$^1$ the magnet limbs; D the brass or non-magnetic cup; E E$^1$ the magnet pole pieces, and F the diaphragm which is clamped between the screw cap B and the edge or rim of the cup D.

According to this invention a strip or bar G of vulcanized fiber or other suitable non-magnetic substance is contained between the magnet limbs C C$^1$. This bar G and the limbs C C$^1$ are rigidly secured together by the magnetic cross piece and distance member C$^2$ by which the limbs C C$^1$ are magnetically connected and which passes through the bar G near to one end. The other end of the bar G is bored and tapped for a screw H. In the form of instrument shown in Figs. 1 to 4 the ends of the limbs C C$^1$ and the bar G are all level or flush with one another at that end of the combined magnets and bar where the latter is screwed. By passing the screw H down through the center of the cup D and screwing it into the bar G as shown in Fig. 1 the ends of the magnet limbs can be drawn tightly up against the under face of the cup. The combined bar G and magnet limbs are circular in cross section and their combined ends fit snugly within the circular wall D$^1$ formed on the lower face of the cup. The cup is perforated with two round holes J J one over the end of each magnet limb. Within each hole is placed an iron disk $J^1$ $J^1$ each of a size and thickness to rest upon the end of the magnet and reach flush to or slightly above the inner surface of the cup. With the disks so in place the magnet pole pieces E $E^1$ are screwed down, one over each disk, on to the inner face of the cup by means of screws K K engaging with holes $K^1$ in the metal of the cup. The disks $J^1$ act as magnetic conductors between the magnet limbs and their pole pieces. The screws K also, if of magnetic metal and long enough to reach the end of the magnet, will permit magnetic flux.

In the modification shown in Figs. 6 and 7 the disks $J^1$ are dispensed with and are substituted by projections $J^2$ from the ends of the magnet limbs C $C^1$ which similarly occupy and pass through holes J in the cup and project to or slightly beyond the inner surface of the cup. The pole pieces E $E^1$ are then screwed down on to them.

The sides of the fiber bar or strip may be formed with longitudinal grooves $G^1$ along which the wires L are led to the coils on the pole pieces, such wires entering the cup through holes M.

N N are screws or terminals on the end of the strip G to which screws the described wires are connected as are also the ends of the flexible wires P.

What I claim is:—

1. In a telephonic receiver, a U-shaped magnet, a non-magnetic bar extending between the limbs thereof, a non-magnetic cup extending across the ends of said magnet and bar, a screw which passes through the bottom of said cup into the end of said bar, magnetic extensions of the magnet passing through the bottom of the cup, and pole pieces which are secured to the cup and on to the magnetic extensions.

2. In a telephonic receiver, a magnet, a non-magnetic bar combined therewith, a non-magnetic cup, a screw which screws the non-magnetic cup to the non-magnetic bar, loose iron disks placed in perforations of the cup and in contact with the magnet ends, and pole pieces screwed down to the cup and on to the iron disks, substantially as set forth.

3. In a telephonic receiver, the combination with a magnet comprising two parallel limbs and a nonmagnetic bar clamped between them and forming therewith a cylindrical structure, of a nonmagnetic cup having a circular wall fitting over the end of said magnet, a screw passing through said cup into the end of said bar, and pole pieces carried inside said cup in line with the ends of said magnet limbs.

In witness whereof I have hereunto set my hand in the presence of two subscribing witnesses.

ALEXANDER MARR.

Witnesses:
WILLIAM GEO. HEYS,
JOHN O'CONNELL.